3,481,888
PROCESS FOR GELLING AQUEOUS POLYVINYL ALCOHOL SOLUTIONS

Harold K. Sinclair, Wilmington, Del., assignor to E. I. du Pont de Nemours and Company, Wilmington, Del., a corporation of Delaware
No Drawing. Filed Oct. 1, 1965, Ser. No. 492,313
Int. Cl. C08f 47/00, 1/92; B01j 13/00
U.S. Cl. 260—2.5                                              8 Claims

---

ABSTRACT OF THE DISCLOSURE

A process for gelling polyvinyl alcohol wherein a time interval is provided between the time the reagents which cause gellation are mixed together and the time at which gelation occurs. The process is accomplished by adjusting the pH of a polyvinyl alcohol solution containing a gelling agent precursor ($TiCl_3$) with a slightly soluble pH modifying agent (MgO) to a pH at which the precursor gels the polyvinyl alcohol.

---

This invention relates to methods for controlling the gelation of polyvinyl alcohol in aqueous solution through the use of certain compounds. In the preferred embodiment, it relates to the method of controlling the gelation of polyvinyl alcohol through the use of certain compounds in conjunction with the regulation of the pH of the polyvinyl alcohol solution.

A number of methods for gelling aqueous polyvinyl alcohol in solution are known in the art. Many of these prior art methods employ gelling agents which act instantaneously to gel the polyvinyl alcohol when added thereto. Such prior art gelling agents are satisfactory when such instantaneous reactions are desired or can be tolerated. The U.S. Patent 2,455,936 to W. G. Lowe is an example of this prior art technology.

However, in many instances, it is desirable to first mix gelling reagents with the aqueous polyvinyl alcohol solution, then subject the solution to further treatment before gelation of the polyvinyl alcohol occurs. For example, polyvinyl alcohol has been shown recently to be useful in the preparation of light weight foams suitable as insulating, acoustical, and packaging materials. In the preparation of such foams, it is necessary to first prepare an aqueous polyvinyl alcohol solution to which are added reagents for gelling the polyvinyl alcohol which do not cause instantaneous gelation. Next, the foam is generated from the solution and is then flowed through a hose or pipe to the position or place of application, whereafter it is essential that the polyvinyl alcohol foam be converted promptly into a gel.

It will be recognized that the gelling reagents must not cause any substantial gelation during the preparation of the polyvinyl alcohol solution or during the generation of foam. However, gelation must occur within seconds or at the most a few minutes after the foam is placed in final position. This is essential for at least one of four reasons: (1) to assure stability of foam structure regardless of how slowly drying occurs, which may require several days or even weeks; (2) to prevent drainage of substantial quantities of liquid to lower levels; (3) to prevent soaking of the foam liquid into porous building materials such as plasterboard, wallboard, electrical wiring, insulation, etc. and/or (4) to permit the foam to be placed in a vertical or largely unconfined position without running or falling out. A rapid change in the foam from a substantially liquid state to a gelled state is particularly essential for the last-mentioned characteristic. If the change from liquid to gel is not fast, the foam will not only adversely soak such porous materials, but also may break down in part with a reduction of its bonding to the building walls. However, as stated above, the gelling should not be completed until after the foam has been generated and flowed or placed in position because a foam in the fully gelled state is not readily flowed through pipes, hoses, orifices, nozzles, etc. without damage to the cellular structure. In contrast, a foam in which the liquid phase has not been gelled is readily hosed, piped, spread and flowed into position.

Consequently, the prior art gelling agents which cause instantaneous gelation cannot be used in a method which includes foam generation. Instead, it is necessary to use a method of controlled gelation, that is, a method whereby gelling reagents are added to an aqueous polyvinyl alcohol solution which do not cause instantaneous gelation but which cause rapid gelation after a desired time interval.

Other uses of aqueous polyvinyl alcohol solutions also require such controlled gelation methods. For example, in the application of coating compositions comprising aqueous polyvinyl alcohol solutions onto porous substrates such as paper or paperboard, it is desirable to have gelling reagents incorporated into such compositions which do not instantaneously gel the polyvinyl alcohol so that it may be conveniently applied onto the substrate but which will cause rapid gelation shortly thereafter to prevent the composition from soaking into the substrate.

An object of this invention is to provide an improved method for the gelation of polyvinyl alcohol in solution. Another object is to provide an improved method for the controlled gelation of polyvinyl alcohol in solution whereby gelling reagents are added to said solution which do not cause instantaneous gelation, but which cause rapid gelation after a desired time interval.

These and other objects are fully attained by the present invention which in the preferred embodiment provides for gelling polyvinyl alcohol in solution by mixing into said solution, (1) a solution-soluble compound of a metal selected from the group consisting of titanium and iron, wherein the valence state of the metal is +3, and (2) a pH modifying agent which may also be referred to as a precursor activator and which after a time interval raises the pH of the solution to a value of at least 5 at which value the metal compound and polyvinyl alcohol react and form a gelled structure. While the metal compound which may also be referred to as a gelling agent precursor, and the pH modifying compound are conventionally added to the polyvinyl alcohol solution separately with the pH modifying agent being added first, these compounds may be added separately, at the same time or in reverse order. The pH modifying agent is conveniently added to the polyvinyl alcohol solution in the dried powdered form and the gelling agent precursor is added as a solution thereof.

The term "polyvinyl alcohol" refers to the water-soluble products obtained by the complete or partial alcoholysis or hydrolysis of polyvinyl esters such as polyvinyl acetate. Complete alcoholysis or hydrolysis indicates that 99–100% of the ester groups of the polyvinyl ester have been replaced by hydroxyl groups. Partial alcoholysis or hydrolysis indicates that 50–99% of the ester groups have been replaced by hydroxyl groups. A preferred polyvinyl alcohol is the commercially available, high molecular weight, fully hydrolyzed grade, having a 4% aqueous solution viscosity of 55–65 centipoises, known commercially as "Elvanol" 72–60. Polyvinyl alcohol solutions other than the preferred example can also be successfully employed.

The term "gelling agent precursor" designates all those substances, complexes and ions which are incapable of gelling polyvinyl alcohol in solution, but which when contacted by a suitable precursor activator will be converted to a gelling agent which does gel polyvinyl alcohol. Included within this term are, for example, ions in a valence state that does not gel polyvinyl alcohol but which are capable of conversion to another valence state by either oxidation or reduction at which the converted ion does gel polyvinyl alcohol. Also encompassed by the expression "gelling agent precursor" are complexes and ions which are not capable of gelling polyvinyl alcohol but which are capable of conversion as by a pH change to either ions or complexes which do gel polyvinyl alcohol. In addition, the term is meant to include substances which in solution at a first pH level do not gel polyvinyl alcohol but which at another pH level do gel polyvinyl alcohol.

Preferred examples of gelling agent precursors are polyvinyl alcohol solution-soluble compounds of titanium and iron, the metal constituent of which is in a valence state of $+3$. These compounds are conveniently dissolved in water and added as solutions to polyvinyl alcohol solutions.

Titanium trifluoride, titanous sulfate and titanium trichloride are examples of compounds of titanium which are soluble in polyvinyl alcohol solutions. Of these compounds titanium trichloride is preferred. This compound is available commercially in a solution labeled "20%" and has a density of 1.35 gms./ml. The acidity of this "20%" solution was found to be 9.5 N. The calculated normality due to titanium trichloride was slightly less than 5.4 N. The rest of the acidity was mainly due to hydrochloric acid which is present in the solution to maintain the solubility of the titanium trichloride. Residual zinc chloride used in the preparation of the titanium $+3$ solution via reduction with metallic zinc was also present contributing to the acidity.

Ferric chloride, ferric bromide and ferric citrate are examples of iron compounds which are soluble in polyvinyl alcohol solutions. Of these compounds, ferric chloride is preferred. Titanium $+3$ cations and ferric ions gel polyvinyl alcohol in pH solutions of 5 or greater but do not bring about gelation at lower pH levels.

Gelation of polyvinyl alcohol through the operation of titanium $+3$ cations on the shift of the pH to at least 5 can be augmented by the inclusion of small but effective amounts of oxidizing agents such as potassium nitrate which act to convert titanium $+3$ cations to titanium $+4$ cations in the pH range of from 3.0 to 5. This compound, when present in the amount of from 0.1 to 1.2%, based on the amount of polyvinyl alcohol present in the solution, is effective in increasing the rate at which gelation occurs. A comparison of Examples 1 through 4 inclusive of Table I, set forth hereinafter, will indicate the time interval control afforded by the addition of potassium nitrate to the polyvinyl alcohol-precursor solution at the time the gelling agent precursor solution is added thereto.

The term "precursor activator" designates those substances which function to convert the gelling agent precursor to a gelling agent. The precursor activators of this invention are substances of slight and/or slow solubility in aqueous polyvinyl alcohol solutions. The solubility of the precursor activator is most significant in this invention since it is the characteristic which enables delay in the gelation of the polyvinyl alcohol after all of the gelling reagents have been mixed therewith. By providing a dissolved quantity of precursor activator in one or both of the solutions which is insufficient to cause gelation and a quantity of undissolved precursor activator in one of the solutions which on mixing of the solutions will dissolve at least in part to increase the total amount of dissolved precursor activator to a level at which an effective amount of gelling agent is liberated or formed, delayed gelation can be obtained. By having different amounts of predissolved precursor activator present in solution, different time delays can be achieved. Of course, the maximum time delay is achieved by adding all of the precursor activator in the undissolved form to a solution containing the gelling agent precursor and polyvinyl alcohol.

The precursor activators or pH modifying agents employed with the above preferred gelling agent precursors are slowly soluble alkaline substances including the slightly soluble salts of weak acids and strong bases, as well as the metal oxides of low solubility and metal hydroxides of low solubility. Examples of these compounds are calcium carbonate, magnesium oxide, zinc oxide and calcium hydroxide.

As indicated above, the precursor activator is preferably mixed with the polyvinyl alcohol solution prior to the addition thereto of the gelling agent precursor. The quantity of precursor activator added to the polyvinyl alcohol solution must be in excess of the amount which is soluble in the polyvinyl alcohol solution. The precursor activator dissolved in the polyvinyl alcohol solution must be of such an amount that the pH of the polyvinyl alcohol solution immediately after the addition thereto of the preferred gelling agent precursor will be less than 5. The amount of undissolved precursor activator present in the polyvinyl alcohol solution must be such that the pH of the polyvinyl alcohol solution after the gelling agent precursor has been added thereto will on dissolving of at least a part thereof increase the pH of the resulting solution to a value of at least 5. In the preferred embodiment, the gelling agent precursor is added as an aqueous solution.

To demonstrate the controlled time delay which can be achieved through the practice of this invention, solutions containing polyvinyl alcohol and precursor activators and solutions of gelling agent precursors were prepared, mixed and the time interval prior to the achievement of gelation was measured. These tests directly indicate the utility of the solutions of this invention as coating compositions for porous substrates. The time control achieved through the selection of the specific gelling agent precursors and precursor activators and amounts thereof which were used in the following tests can also be achieved when the mixed solutions are foamed prior to gelation. Additional tests have indicated that fillers including infra-red absorbers such as carbon black and reflectors such as aluminum powder as well as flame retardants such as urea and plasticizers such as glycerine can be added to either or both solutions and that the mixed solutions can be foamed and projected onto substrates prior to gelation.

The apparatus employed to demonstrate the utility of this invention consisted of the following structure. Two hypodermic syringes were fixedly mounted in side by side relationship in line with and adjacent to a vertically disposed rod. On the rod was placed a closely fitting slidable collar of sufficient diameter to engage the plungers of the hypodermic syringes in such a manner that solutions contained within the syringes could be simultaneously driven therefrom on movement of the collar along the rod. One of these syringes had a cross sectional area of 0.9 cm.² which was twice the cross sectional area of the other. The larger syringe was loaded with a 4.5% "Elvanol" 72–60 polyvinyl alcohol aqueous solution to which had been added a dry, powdered precursor activator. The smaller syringe was loaded with an aqueous gelling agent precursor solution. In the examples in which titanium trichloride is the gelling agent precursor, the aqueous solution used is the commercially available "20%" solution described above. The exit ends of these syringes were connected by suitable tubing to the opposite arms of a capillary T. The capillary T had intersecting bores of 1.5 mm. and each of the arms and the leg of the capillary T were 1 cm. long. Rapid mixing of the two solutions occurred in the leg of the T on simultaneous passage of the solutions therethrough. The mixed solutions passed immediately from the leg of the capillary T into suitable open receptacles, 25 ml. test tubes, which were provided for this purpose. A glass rod probe and stop watch were used to determine the time interval which elapsed between mixing of the solutions and gelation of the polyvinyl alcohol in the receptacles.

In the following table, which records the identity and amounts of the precursor activator and gelling agent precursor used together with the time interval between mixing and gelation, all percentages are percentages by weight of the polyvinyl alcohol used.

ducing shorter time intervals. With titanium trichloride, the amount of calcium carbonate is preferably varied between 5 and 20% based on the amount of polyvinyl alcohol present. The amount of magnesium oxide and zinc oxide used with titanium trichloride is preferably maintained respectively within the ranges of 1 to 5% and 5 to 20% based on the amount of polyvinyl alcohol present. In the case of gelation through the operation of ferric compounds, the amount of calcium carbonate can vary within the preferred range of 10 to 30% based on the amount of polyvinyl alcohol present and the amount of magnesium oxide and zinc oxide vary respectively within the ranges of 3 to 10% and 5 to 25%, all percentages being by weight based on the amount of polyvinyl alcohol present. In all instances where the preferred gelling agent precursors are employed, the amount of precursor activator employed is sufficient to ultimately shift the pH of the mixed solution to a level of at least 5 and the amount of gelling agent precursor present is sufficient to gel the polyvinyl alcohol.

Having described the various embodiments of this invention to illustrate rather than limit the invention, what is claimed is as follows:

TABLE I.—GELATION SYSTEMS

| Example Number | Reagents and Percentages (Based on Polyvinyl Alcohol) [a] | Time Interval (Min.) | Initial pH (at 5-10 Sec.) | Approx. Final pH [b] |
|---|---|---|---|---|
| 1 | $TiCl_3$, 5.8; MgO, 2.2 | 0.5 | 4.8 | 6.1 |
| 2 | $TiCl_3$, 5.8; MgO, 2.2; $KNO_3$, 0.4 | 0.3 | 4.8 | 6.5 |
| 3 | $TiCl_3$, 5.8; ZnO, 6.7 | 0.5 | 4.6 | 5.2 |
| 4 | $TiCl_3$, 5.8; ZnO, 6.7; $KNO_3$, 0.7 | 0.2 | 4.6 | 5.6 |
| 5 | $TiCl_3$, 5.8; $CaCO_3$, 11.1 | 1 | 3.8 | 5.1 |
| 6 | $TiCl_3$, 5.8; $CaCO_3$, 11.1; $KNO_3$, 0.4 | 0.4 | 3.2 | 5 |
| 7 | $TiCl_3$, 5.8; $CaCO_3$, 8.9; $KNO_3$, 0.9 | 0.3 | 3.4 | 5 |
| 8 | $TiCl_3$, 4.0; $CaCO_3$, 8.9; $KNO_3$, 0.9 | 0.2-0.3 | 3.8 | 5.3 |
| 9 | $FeCl_3$, 5.6; MgO, 4.4 | 0.5 | 3.4 | 8.0 |
| 10 | $FeCl_3$, 5.6; ZnO, 6.7 | 0.3 | 4.9 | 5.1 |
| 11 | $FeCl_3$, 7.8; $CaCO_3$, 20.0 | 0.7 | 4.2 | 6.1 |

[a] "Elvanol" 72-60 which was present at a concentration of roughly 3%, based upon the water content and the combined solutions.
[b] These values are approximate only. The times of the final pH readings varied between 5 mins. and several hours after mixing and pH's had not yet become constant in many cases.

As indicated in the examples set forth in the above table, time intervals within the range of 0.2 to 1 minute can be achieved through the use of the materials disclosed and in the relative amounts set forth. By decreasing the amount of water present in the solution containing the precursor activator, a proportionately smaller amount of the precursor activator will be predissolved and longer time intervals between mixing of the solutions and gelation can be obtained. Conversely, by having larger quantities of water present in the solution containing the precursor activator, shorter time intervals can be obtained. It has been found, however, that time intervals within the range of 0.2 to 1 minute are sufficiently long to enable mixed solutions to be foamed and applied where desired. Time intervals less than 1 minute do not result in soaking of porous substrates or collapse of the foamed solutions.

The specific amounts of ingredients employed in the above examples are merely exemplary and not limiting. While a 4.5% solution of polyvinyl alcohol has been used in the above examples, concentrations of from 0.5% to 10% can be used. Titanium trichloride is preferably used in the range of from 3 to 8% based on the weight of polyvinyl alcohol present. Larger amounts, however, do not adversely modify the quality of the gelled foam and can be used as desired. Ferric chloride is preferably used in the range of from 4 to 12% based on the amount of polyvinyl alcohol present; but here again, larger amounts can be employed as desired.

The amount of precursor activator can be varied within large limits, with larger amounts thereof generally pro- 1. A process for gelling polyvinyl alcohol wherein a time interval is provided between the time the reagents which cause gelation of the polyvinyl alcohol are mixed therewith and the time gelation of the polyvinyl alcohol occurs, comprising providing a first liquid comprising an aqueous solution of a gelling agent precursor selected from the group of water soluble compounds which dissolve to form titanium +3 cations and ferric cations, providing a second liquid containing a slightly water soluble pH modifying agent, said pH modifying agent being an alkaline substance and being present in said second liquid in excess of the amount soluble therein, the dissolved amount of pH modifying agent present in said second liquid being insufficient to cause a pH of the two liquids on mixing of the same at which gelation of the polyvinyl alcohol occurs, the undissolved amount of the pH modifying agent present in said second liquid being sufficient on dissolving of at least a part thereof to change the pH of the two liquids after mixing of the same to a value at which gelation of the polyvinyl alcohol occurs, at least one of said liquids containing water soluble polyvinyl alcohol, mixing the two liquids, dissolving at least the part of the undissolved pH modifying agent necessary to cause gelation of the polyvinyl alcohol, and gelling the polyvinyl alcohol.

2. The process of claim 1 wherein the mixed liquids are foamed prior to gelation.

3. The process of claim 1 wherein the amount of dissolved pH modifying agent in said second liquid prior to mixing is insufficient to cause the pH of the mixed liquids to have a value as high as 5.

4. The process of claim 3 wherein the gelling agent precursor is a compound which dissolves to form titanium +3 cations.

5. The process of claim 3 wherein the gelling agent precursor is a compound which dissolves to form titanium +3 cations and wherein the gelling agent solution contains an oxidizing agent.

6. The process of claim 5 wherein the mixed liquids are foamed prior to gelation.

7. The process of claim 3 wherein the pH modifying agent is selected from calcium carbonate, magnesium oxide, zinc oxide, and calcium hydroxide.

8. The process of claim 7 wherein the gelling agent precursor is a compound which dissolves to form titanuim +3 cations.

References Cited

UNITED STATES PATENTS

| | | |
|---|---|---|
| 2,455,936 | 12/1948 | Lowe. |
| 3,258,442 | 6/1966 | Sinclair. |
| 3,318,856 | 5/1967 | Deyrup _____ 260—2.5 |

MURRAY TILLMAN, Primary Examiner

W. J. BRIGGS, Assistant Examiner

U.S. Cl. X.R.

117—161; 260—29.6, 91.3